UNITED STATES PATENT OFFICE.

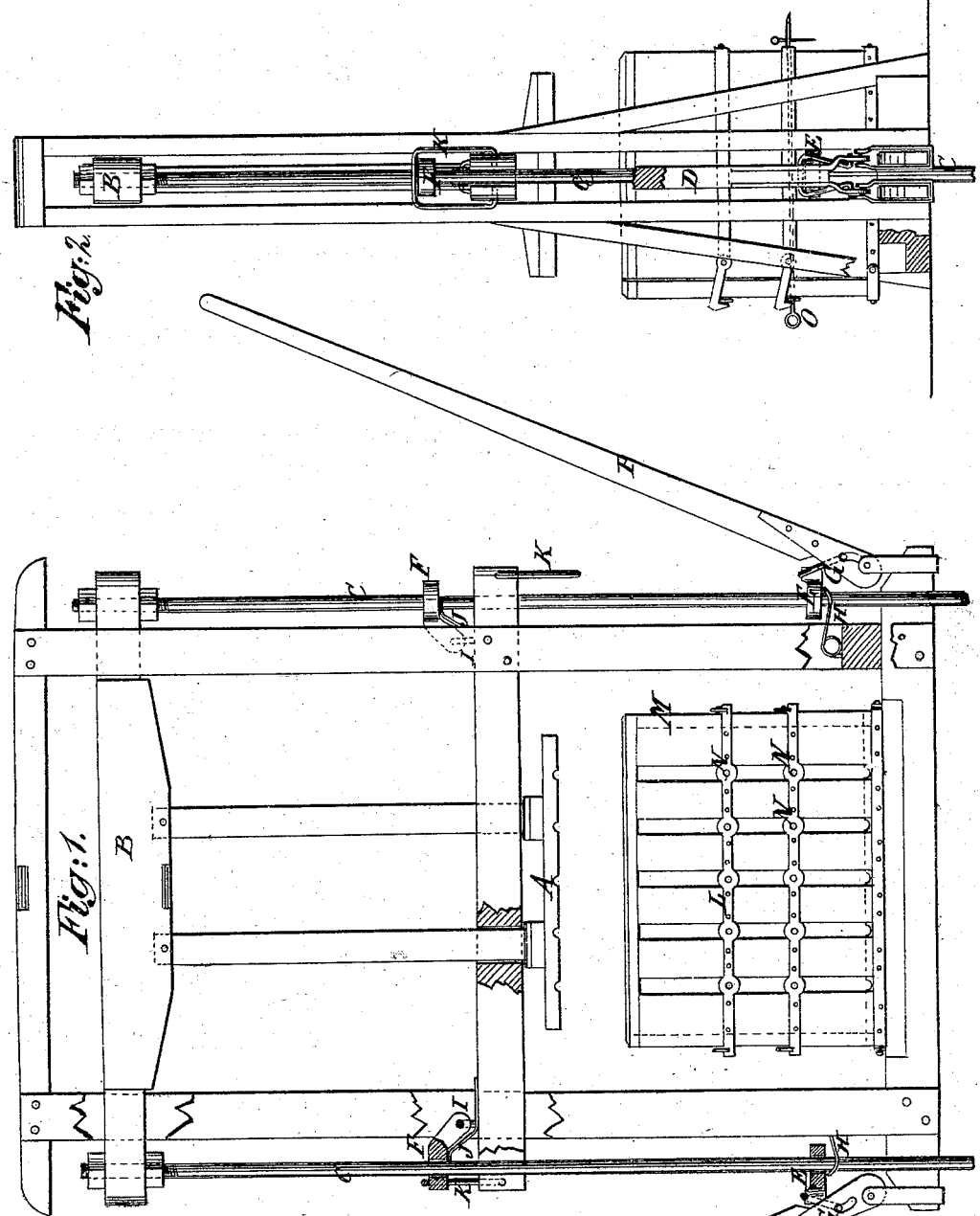

JOHN GRAMELSPACHER, OF JASPER, INDIANA.

IMPROVEMENT IN COTTON-PRESSES.

Specification forming part of Letters Patent No. 152,797, dated July 7, 1874; application filed February 14, 1874.

*To all whom it may concern:*

Be it known that I, JOHN GRAMELSPACHER, of Jasper, in the county of Dubois and State of Indiana, have invented a new and Improved Press, of which the following is a specification:

The invention will first be fully described, and then pointed out in the claims.

Figure 1 is a side view of the press, partly in elevation and partly in section; and Fig. 2 is another side view of the same character.

Similar letters of reference indicate corresponding parts.

A is the follower; B, the cross-head to which it is attached; C, the rods by which the cross-head and follower are worked; D, the levers, and E the cramping or griping pawls, for working the rods; and F, the griping-pawls for holding the rods while the griping-pawls let go. The pawls E are connected to the levers by a yoke, G, and they have a spring, H, under them for throwing them up, so as to release the gripe on the rod; also to raise them for taking hold again as soon as the levers let go. The pawls are coupled to the frame by the links I, and held by a spring, J, so as to gripe the rods and hold them against going back. A yoke, K, is provided with each pawl F, to hold it down against its spring, and prevent it from griping when it is desired to raise the follower. L represents bars attached to the two sides of the press-case M, with holes N at the slots in the sides of the case, to introduce rods O above a quantity of pressed material, not enough for a complete bale, to prevent it from springing up while the follower is raised to press in another portion.

This is designed to facilitate the packing of the bales more compactly with small power than can be done by pressing in the full measure of the bale at one operation.

Having thus described my invention, I claim as new and desire to secure by Letters Patent—

1. The combination, with levers and rods, of the pawl E, yoke G, and spring H, arranged as and for the purpose described.

2. The combination, with rods and detent-pawls F, of link I, spring J, and yoke K, arranged as and for the purpose set forth.

3. The combination, with press-box, of the bars L, having holes N, and the rods O, as and for the purpose specified.

JOHN GRAMELSPACHER.

Witnesses:
TALIAFERRO WERTZ,
FRANK FINK.